Dec. 9, 1958  D. P. FLOOD  2,863,308
COUPLING DEVICE FOR SMALL MOTORS
Filed June 27, 1955
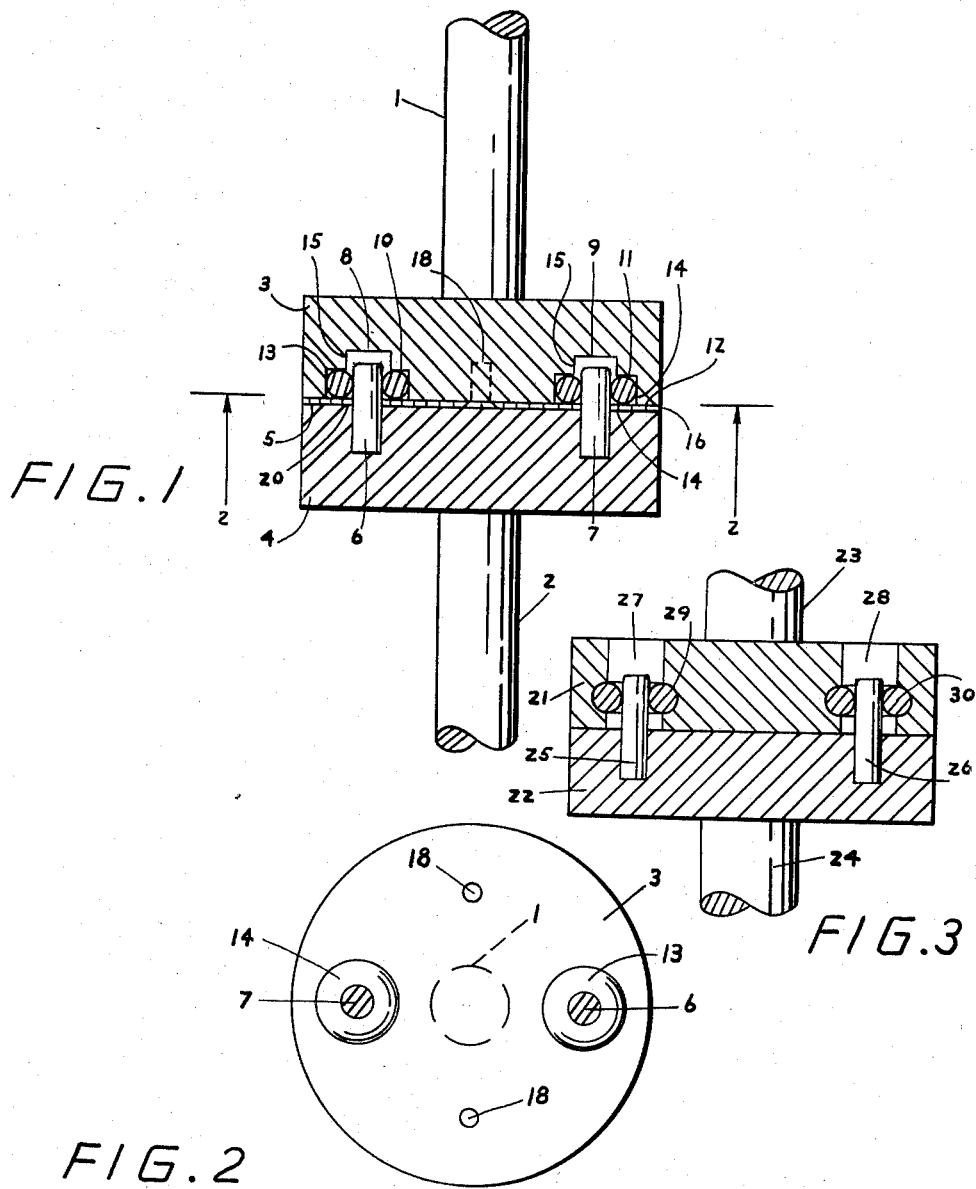
INVENTOR.
DAVID P. FLOOD
BY
EZEKIEL WOLF
HIS ATTORNEY.

United States Patent Office 2,863,308
Patented Dec. 9, 1958

2,863,308

COUPLING DEVICE FOR SMALL MOTORS

David P. Flood, Natick, Mass.

Application June 27, 1955, Serial No. 518,170

5 Claims. (Cl. 64—10)

The present invention relates to a coupling device for motors of very small sizes operating at high R. P. M.'s.

It has been found in the operation of very small motors driven at substantial speeds, upwards of several thousands R. P. M., that the coupling devices used to transmit the power from the shaft to the attached device will frequently break down and require replacement. This is due, very often, to the fact that in the operation of small motors weighing a fraction of a pound, the size of the coupling device is naturally limited in weight. This results in a coupling device which structurally does not have the strength to withstand continued operation at high speeds. Frequently, this difficulty in existing coupling devices for these small high speed motors is substantially aggravated by a slight misalignment between the shaft of the motor and the shaft of the driven apparatus. This misalignment causes an excessive torque action on the coupling device which, in turn, will result in a premature break-down of the coupling unit.

Accordingly, it is an object of the present invention to provide a coupling unit which is structurally strong in nature but, nevertheless, is not excessive in size or weight.

A further object of the present invention is to provide a coupling unit adapted to operatively connect the shaft of a small high speed motor with a shaft of a driven apparatus in such a manner as to readily compensate for small misalignments between the two shafts.

Another object of the present invention is to provide a coupling unit which is so constructed as to permit a ready disengagement of the driven shaft from the driving shaft of a high speed motor.

One more object of the present invention is to provide a coupling member for a high speed, small motor which is simple in construction and in which slippage is reduced to a minimum.

These and other objects of the present invention will be further understood when considered in connection with the accompanying drawings, in which:

Figure 1 is a partial cross sectional elevation of the invention,

Figure 2 is a cross sectional view taken substantially along the line 2—2 of Figure 1, and Figure 3 is a partial cross sectional elevation of a modification of the invention.

The present invention is designed particularly to operate very small fractional horse power high speed motors for substantial and continued lengths of time.

In the drawings, 1 represents the shaft of the motor and 2 represents the shaft of the driven element or device. A cylindrical plate 3 is secured by suitable means to the shaft 1, while a facing cylindrical plate 4 is secured by suitable means to the shaft 2. These cylindrical plates 3 and 4 are axially balanced on their respective shafts 1 and 2. The inner face 5 of the cylindrical plate 4 has projecting from its surface a pair of preferably cylindrical pins 6 and 7. These cylindrical pins 6 and 7 are firmly secured at diametrically opposite positions on the face of the cylindrical plate 4 so as to maintain perfect balance of this portion of the coupling element.

A pair of recesses 8 and 9 having coaxial cylindrical shoulder sections 10 and 11 are formed in the face 12 of the cylindrical plate 3 in positions adapted to receive the rounded end of the projecting pins 6 and 7. O rings 13 and 14, having outer circumferences closely fitting the outer walls of the shoulder sections, are positioned respectively within the cylindrical recessed section of the holes 8 and 9. These O rings have inner diameters such as to extend their inner edges to a point over or just inside the side walls 15 of the holes 8 and 9. This inner diameter of the O ring is somewhat less than the diameter of the pins 6 and 7.

A thin plate 16 having openings aligned with the hole through the O ring is secured over the inner face 12 of the plate 3 by suitable means such as screws 18, whereby the O rings 13 and 14 are secured in position.

When the coupling element is fitted together with the pins 6 and 7 projecting through the openings in the plate 16 and through the centers of the O rings, there is a slight clearance between the top of the pins 6 and 7 and the bottom of the holes 8 and 9 respectively. The O rings 13 and 14, however, snugly secure the sides of the pins 6 and 7 in a position whereby these pins are held substantially axial to and spaced from the side walls of the holes 8 and 9.

As these O rings 13 and 14 are made of a resilient material preferably neoprene and as they project inwardly over the side walls 15 of the holes 8 and 9, they act as a resilient cushion for the pins 6 and 7 as the shaft 1 rotates carrying with it the shaft 2. This resilience is sufficient to take up any unbalance in the coupling system caused by the misalignment of the shaft 1 and 2.

Although the embodiment of the present invention is described using two pins 6 and 7, it is clear that one or more pins may readily be used, provided there is a minimum satisfactory balancing of them. In the event that one pin is used, the coupling device could be balanced by suitably placing an additional weight at proper position on the walls of one of the plates 3 or 4.

O rings 13 and 14 may and preferably have slightly larger diameters than the cylindrical recess sections 10 and 11 so that the O rings are slightly compressed when they are forced into the cylindrical recesses. Further, the inner diameter of the O rings in their positions have a natural diameter smaller than the diameter of the pins 6 and 7 so that the pins exert an outward pressure in the inner surface of the O rings. The O rings are, therefore, so held that they must move in the motion of misalignment of the two halves of the coupling.

Since the cover plate 16 for the section 3 is attached to the section 3, it must permit freedom of motion of the section 3 to allow accommodations of misalignment motion. Therefore, there must be a slight clearance of the disc 16 around the coupling pins 7 and 6 as indicated at 19 and 20 respectively.

Referring to Figure 3, there is illustrated a coupling unit having cylindrical plates 21 and 22 axially secured respectively to the shafts 23 and 24 with the inner faces of the plates 21 and 22 in facing relationship to one another. A pair of cylindrical pins 25 and 26 are secured to the plate 22 at diametrically opposite locations and project upwardly and normal to the inner surface of the plate 22. These pins 25 and 26 extend into the openings 27 and 28 respectively in substantially parallel alignment. Positioned in these openings 27 and 28 about the pins 25 and 26 are the O rings 29 and 30. These O rings fit into semicircular cross section grooves somewhat smaller in diameter than the O rings themselves so that the O rings are force fit into these grooves. Consequently, the inner diameters of the O rings are somewhat smaller than the diameter of the pins 25 and 26. Thus, when the plates 22 and 21 are fitted together, the pins 25 and 26 are securely held by the O rings 29 and 30. Thus, the operation of this coupling unit is substantially similar to the operations as previously discussed in connection with the other modification.

While it is not necessary for operation, a small amount of silicon grease may be applied to the O rings and between the pins and the O rings for improved operation and uniform contact and wear.

In the present invention the stiffness of the coupling may be measured in angular displacement of the two halves of the coupling per units of torque. It is relatively simple to obtain the desired stiffness in the present case which may be accomplished by choosing the proper radius from the center of the coupling to the center of the pin, or by choosing the proper number of pins per coupling or by the sizes of the O rings and recesses or by the amount of radial compression on the O rings.

The stiffness may be made essentially linear or non-linear as desired through proper choice of the above elements.

It should be understood that misalignment may occur when the driven and driving shafts are not perfectly aligned one with another, and consequently the facing surfaces are either not perfectly parallel or in contact over their entire surfaces. This misalignment is compensated for in the arrangements described, but in arrangements of other types, the inter-engaging elements would rapidly wear their bearing surfaces.

Having now described my invention, I claim:

1. A coupling device of the type described comprising facing driving and driven coupling plates, a plurality of pins projecting from one of said plates, means forming recesses in the other of said plates positioned to receive said pins, said recesses having a shoulder section formed at the mouth of the recess, and O rings positioned in said shoulder sections with their inner diameters extending within the inner edge of the shoulder and adapted to snugly engage the side walls of said pins.

2. A coupling device as set forth in claim 1 wherein said O rings are secured in position by a plate secured over said recesses with holes therein aligned with the inner diameters of said O rings.

3. A coupling device of the type described comprising facing driving and driven coupling plates, a plurality of pins projecting from one of said plates, means forming recesses in the other of said plates positioned to receive said pins, said recesses having enlarged annular sections, O rings compressed in said enlarged sections having an inner diameter sized to closely engage the sides of said pins and space said pins from the side walls of said recesses.

4. A coupling device of the type described comprising facing driving and driven coupling plates, a plurality of pins projecting normally from one of said plates, means forming holes in the other of said plates located to receive said pins, said holes having annular recesses formed in and spaced from the ends of the sidewalls thereof, and O rings positioned in said recesses with their inner diameters extending inwardly of said sidewalls and adapted to snugly engage the sidewalls of said pins.

5. A device as set forth in claim 4 wherein said O rings have an outer diameter greater than said recesses whereby said O rings are retained within said recesses under compression.

References Cited in the file of this patent

UNITED STATES PATENTS

| | | |
|---|---|---|
| 2,122,837 | Guy | July 5, 1938 |
| 2,517,887 | Korn | Aug. 8, 1950 |

FOREIGN PATENTS

| | | |
|---|---|---|
| 438,226 | Great Britain | Nov. 13, 1935 |
| 450,706 | Great Britain | July 23, 1936 |